(12) United States Patent
Ohya

(10) Patent No.: US 6,400,120 B2
(45) Date of Patent: Jun. 4, 2002

(54) MUTUAL CONNECTION JUDGING CIRCUIT

(75) Inventor: Kazumasa Ohya, Utsunomiya (JP)

(73) Assignee: NEC Tokin Tochigi, Ltd., Utsunomiya (JP)

( * ) Notice: Subject to any disclaimer, the term of this patent is extended or adjusted under 35 U.S.C. 154(b) by 0 days.

(21) Appl. No.: 09/822,227

(22) Filed: Apr. 2, 2001

(30) Foreign Application Priority Data

Apr. 3, 2000 (JP) ........................................ 2000-100147

(51) Int. Cl.$^7$ ............................................. H01M 10/46
(52) U.S. Cl. ....................................................... 320/103
(58) Field of Search ................................ 320/103, 104, 320/127, DIG. 12

(56) References Cited

U.S. PATENT DOCUMENTS 5,931,245 A * 8/1999 Uetake et al.
6,259,675 B1 * 7/2001 Honda

* cited by examiner

*Primary Examiner*—Edward H. Tso
(74) *Attorney, Agent, or Firm*—Armstrong, Westerman & Hattori, LLP

(57) ABSTRACT

The present invention provides a mutual connection judging circuit for judging mutual connection between a device 3 with an incorporated battery 4 and a charger 1, wherein there are provided transistors Q1 and Q2 on the charger 1 side and the device 3 side respectively, bases of the transistors Q1 and Q2 on the charger 1 side and the device 3 side are connected with each other, and mutual connection is judged by collector potential of the transistors Q1 and Q2. The charger 1 controls the charging by judging mutual connection depending upon whether the collector of the PNP transistor Q1 is in opened state or not. The device 3 comprises a circuit Q3 for controlling emitter potential of the NPN transistor Q2, controls emitter potential depending upon whether the charging is in enable state or not, and turns on or off the NPN transistor Q2, and the charger 1 starts the charging by judging collector potential of the PNP transistor Q1. With the features of construction as described above, the mutual connection can be confirmed by a single signal line, and it is possible to control connection signal from the device side.

6 Claims, 1 Drawing Sheet

MUTUAL CONNECTION JUDGING CIRCUIT

The present invention relates to a mutual connection judging circuit for judging mutual connection of a device with an incorporated battery and a charger.

FIG. 2 is a diagram for explaining a conventional example of a mutual connection judging circuit. In the figure, ① represents a signal line for confirming the connection on charger side, and ② denotes a signal line for confirming the connection on device side. When a charger is connected with a device with an incorporated battery, for the purpose of starting the charging and terminating the charging by confirming the mutual connection or interconnection, it is necessary to judge full charging by the charging current and the charging voltage. However, when operating condition of the device is not confirmed, the charging current may be supplied from the charger while load current corresponding to various loading conditions is flowing. In this respect, it is difficult to judge or recognize the full charging, and it is not possible to control the starting and the termination of the charging. Therefore, for the purpose of recognizing the connection to the charger with the device and the stop operation of the device during charging operation, it is necessary to have two signal lines of ① and ② as shown in FIG. 2.

However, when the device with an incorporated battery is connected with the charger and the battery is charged if conventional mutual connection judging method as described above is used, the charger and the device judge the connection respectively via the signal lines ① and ②. In the one-sided detection of full charging by the charger, the detection itself is ambiguous and indefinite. As a result, charging may be performed beyond the limit, and this may impair the performance characteristics of the battery. Also, it is necessary to have two signal lines for mutual recognition of connection as shown in FIG. 2, and this means that there are many connection points and complicated structure is needed.

SUMMARY OF THE INVENTION

To solve the above problems, it is an object of the present invention to provide a mutual connection judging circuit for confirming mutual connection by a single signal line and for controlling connection signal from the device side.

To attain the above object, the present invention comprises a transistor on each of the charger side and the device side, a base of the transistor on the charger side is connected with a base of the transistor on the device side, and mutual connection is judged by collector potential of the transistor on the charger side and by collector potential of the transistor on the device side. In said circuit, a PNP transistor is provided as the transistor on the charger side, and charging is controlled by judging the mutual connection depending upon whether the collector of the PNP transistor is in opened state or not. Further, there is provided an NPN transistor as the transistor on the device side, and the device comprises a circuit for controlling emitter potential of the NPN transistor, said device turns on or off the NPN transistor by controlling the emitter potential depending upon whether the charging is in enable state or not, and said charger side starts the charging by judging collector potential of the PNP transistor.

Also, the present invention comprises a mutual connection judging circuit for judging mutual connection of a device with an incorporated battery and a charger, wherein said circuit comprises a transistor with a base thereof connected to a terminal for recognizing connection with the device and with an emitter thereof connected to a power source of the charger, and mutual connection is judged by detecting whether a collector of the transistor is in opened state or not. Said circuit comprises a transistor with a base thereof connected to a terminal for recognizing connection with the charger side, and with an emitter thereof grounded, and mutual connection is judged depending upon whether the collector of the transistor is in opened state or not. Further, there is provided a switching circuit for controlling the switching of the emitter of the transistor to grounded state or to opened state.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

Figure 1:
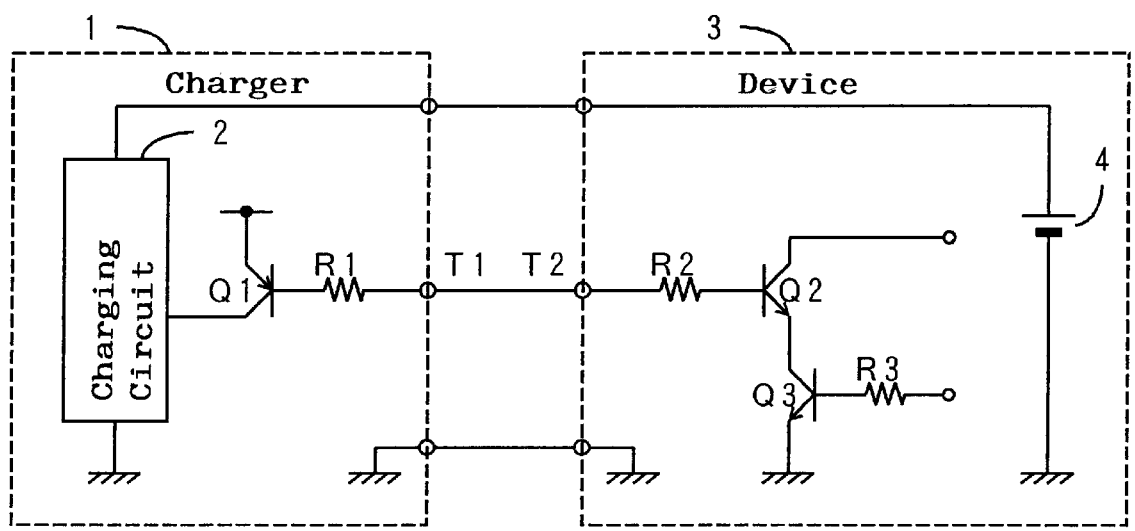
FIG. 1 is a diagram of an embodiment of a mutual connection judging circuit according to the present invention.
Figure 2:
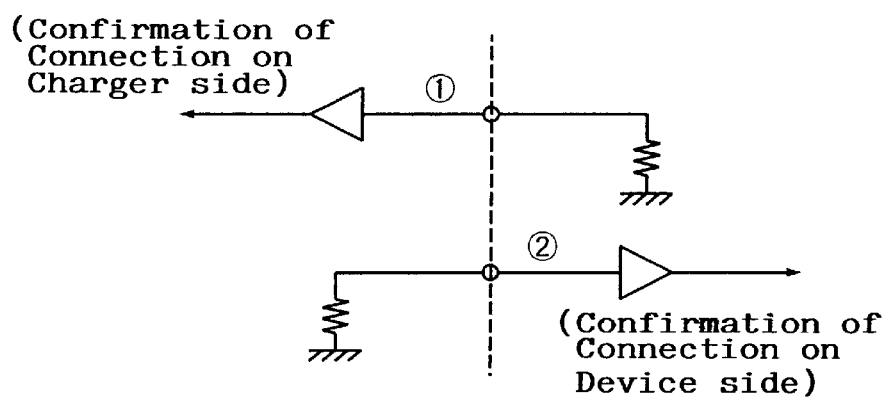
FIG. 2 is a diagram for explaining a conventional example of mutual connection judging circuit.

Description will be given below on an embodiment of the present invention referring to the drawings. FIG. 1 is a diagram showing an embodiment of a mutual connection judging circuit according to the present invention. In the figure, reference numeral 1 denotes a charger, 2 a charging circuit, 3 a device, 4 a battery, Q1 to Q3 each represents a transistor, R1 to R3 each represents a resistance, and T1 and T2 each represents a terminal.

In FIG. 1, the charger 1 comprises a charging circuit 2 and a transistor Q1 for judging or recognizing mutual connection. The device 3 is, for instance, a notebook-sized personal computer or other type of portable electronic device with an incorporated battery. It comprises a transistor Q2 for judging mutual connection, and a transistor Q3 for control. The transistor Q1 is a PNP transistor with its emitter connected to a power source of the charger 1, its base connected to a terminal T1 for recognizing the connection via a resistance R1 for protection, and its collector connected to a charging circuit 2, or it is a p-channel FET. The transistor Q2 is an NPN transistor with its emitter grounded, its base connected to a terminal T2 for recognizing the connection via a resistance R2 for protection, and its collector connected to a control bias terminal, or it is an n-channel FET. The transistor Q3 is a control element for controlling the switching of the emitter of the transistor Q2 to grounded state or opened state, and it is an NPN transistor for grounding the emitter of the transistor Q2 via collector and emitter and with its base connected to the collector side of the transistor Q2 via a resistance R3., or it is an n-channel FET.

Next, description will be given on operation. When the charger 1 is connected to the device 3, the terminals T1 and T2 for recognizing the connection are connected with each other. The base of the transistor Q1 connected to the terminal T1 for recognizing the connection of the charger 1 is connected to the base of the transistor Q2 connected to the terminal T2 for recognizing the connection of the device 3 via the resistances R1 and R2 for protection. Therefore, when a predetermined bias voltage is applied on the control bias terminal of the device 3, the transistor Q3 is turned on. Thus, both the transistor Q1 and the transistor Q2 are turned on. At the charger 1, the collector of the transistor Q1 is on the level of the power source. The changes in collector signal level of the transistor Q1 is detected, and charging is started by the charging circuit 2.

On the other hand, at the device 3, the transistor Q2 is turned on, and the start of the charging is recognized by detecting the change in collector signal level of the transistor Q2. Then, the operation of the device 3 is stopped or restricted. As described above, when the operation of the device 3 is stopped or restricted, it can be regarded at the charger 1 as the same condition as in the case where charging is performed only to the battery 4. Thus, it is possible to increase the detection accuracy of full charging. When the battery 4 is not connected, or when it is not desired to start the charging such as the case where the device 3 is executing the processing, which should not be interrupted, the transistor Q3 is turned off by decreasing the bias voltage applied on the control bias terminal, and the emitter of the transistor Q2 is opened. As a result, it is possible to avoid the recognition of the connection by the transistor Q1 and to prohibit or terminate the charging.

It is needless to say that the present invention is not limited to the above embodiment, and various changes and modifications can be made. For instance, in the above embodiment, the transistor Q3 for control is inserted and connected between the emitter of the transistor Q2 on the device side and the earth, while the emitter of the transistor Q2 may be directly grounded. In such case, the connection of the charger 1 with the device 3 serves as a judging signal by itself when the transistor Q1 is turned on the charger side and the transistor Q2 is turned on the device side.

As it is evident from the above description, the present invention provides a mutual connection judging circuit for judging mutual connection between the device with an incorporated battery and a charger, and the circuit comprises a PNP transistor on the charger side and an NPN transistor on the device side. The base of the PNP transistor is connected to the base of the NPN transistor, and mutual connection is judged by collector potential of the transistors. The charger controls the charging by judging the mutual connection depending upon whether the collector of the PNP transistor is in open state or not. The device comprises a circuit for controlling emitter potential of the NPN transistor and turns on or off the NPN transistor by controlling the emitter potential depending on whether the charging is in enable state or not. The charger starts the charging by judging collector potential of the PNP transistor. In this connection, the mutual connection can be confirmed by a single signal line, and connection signal can be controlled from the device. Therefore, operation is stopped or operation is restricted by recognizing the mutual connection on the device side, and it is possible to avoid unpredictable influence on the operation of the charger.

I claim:

1. A mutual connection judging circuit for judging mutual connection between a device with an incorporated battery and a charger, said circuit comprising a transistor on each of the charger side and the device side, a base of the transistor on the charger side is connected with a base of the transistor on the device side, and mutual connection is judged by collector potential of the transistor on the charger side and by collector potential of the transistor on the device side.

2. A mutual connection judging circuit according to claim 1, wherein a PNP transistor is provided as the transistor on the charger side, and charging is controlled by judging the mutual connection depending upon whether the collector of the PNP transistor is in opened state or not.

3. A mutual connection judging circuit according to claim 2, wherein there is provided an NPN transistor as the transistor on the device side, and the device comprises a circuit for controlling emitter potential of the NPN transistor, said device turns on or off the NPN transistor by controlling the emitter potential depending upon whether the charging is in enable state or not, and said charger side starts the charging by judging collector potential of the PNP transistor.

4. A mutual connection judging circuit for judging mutual connection of a device with an incorporated battery and a charger, wherein said circuit comprises a transistor with a base thereof connected to a terminal for recognizing connection with the device and with an emitter thereof connected to a power source of the charger, and mutual connection is judged by detecting whether a collector of the transistor is in opened state or not.

5. A mutual connection judging circuit for judging mutual connection of a device with an incorporated battery and a charger, wherein said circuit comprises a transistor with a base thereof connected to a terminal for recognizing connection with the charger side and with an emitter thereof grounded, and mutual connection is judged depending upon whether the collector of the transistor is in opened state or not.

6. A mutual connection judging circuit according to claim 5, wherein there is provided a switching circuit for controlling the switching of the emitter of the transistor to grounded state or to opened state.

* * * * *